United States Patent [19]
DeHart

[11] Patent Number: 6,126,748
[45] Date of Patent: Oct. 3, 2000

[54] STATOR CORE RESIN REMOVER

[75] Inventor: Hobart DeHart, Austin, Ind.

[73] Assignee: Reliance Electric Technologies, LLC, Thousand Oaks, Calif.

[21] Appl. No.: 09/104,722

[22] Filed: Jun. 25, 1998

[51] Int. Cl.[7] .................................................. B05C 11/04
[52] U.S. Cl. ........................... 118/63; 118/105; 118/107; 118/110; 15/256.5
[58] Field of Search ............................. 118/63, 105, 107, 118/100, 110, 317, 318, DIG. 10; 15/256.5, 93.1, 97.1, 101; 427/104, 355, 356, 359; 29/596; 310/44, 45, 62, 63, 12

[56] References Cited

U.S. PATENT DOCUMENTS

| | | | |
|---|---|---|---|
| 2,517,780 | 8/1950 | Frank | 118/105 |
| 2,793,538 | 5/1957 | Sears | 15/256.5 |
| 2,884,654 | 5/1959 | Fall | 15/256.5 |
| 3,211,573 | 10/1965 | Hight et al. | 118/105 |
| 3,247,004 | 4/1966 | Dosser | 427/104 |
| 3,885,521 | 5/1975 | von Arx | 118/105 |
| 5,474,799 | 12/1995 | Thigpen et al. | 427/104 |
| 5,614,930 | 3/1997 | Osborne et al. | . |
| 5,709,751 | 1/1998 | van der Meulen | 118/413 |
| 5,745,133 | 4/1998 | Hendricks et al. | . |

*Primary Examiner*—Laura Edwards
*Attorney, Agent, or Firm*—John J. Horn; William R. Walbrun; Himanshu S. Amin

[57] ABSTRACT

A system for removing resin from the stator core of a stator of a motor involves means for removing resin (1) from an inner circumferential surface surrounding the bore of the stator core; (2) from the outer circumferential surface of the stator core; and (3) from between the windings along the end surfaces of the stator core. The circumferential surfaces have resin removed from them by moving the surfaces relative to a series of wipers. The wipers push the resin off the surfaces as they sweep the surfaces. Resin is removed from the end surfaces by blowing the resin radially inward, where it either drips off the core or is deposited on the inner circumferential surface, from which it is removed by wipers.

23 Claims, 8 Drawing Sheets

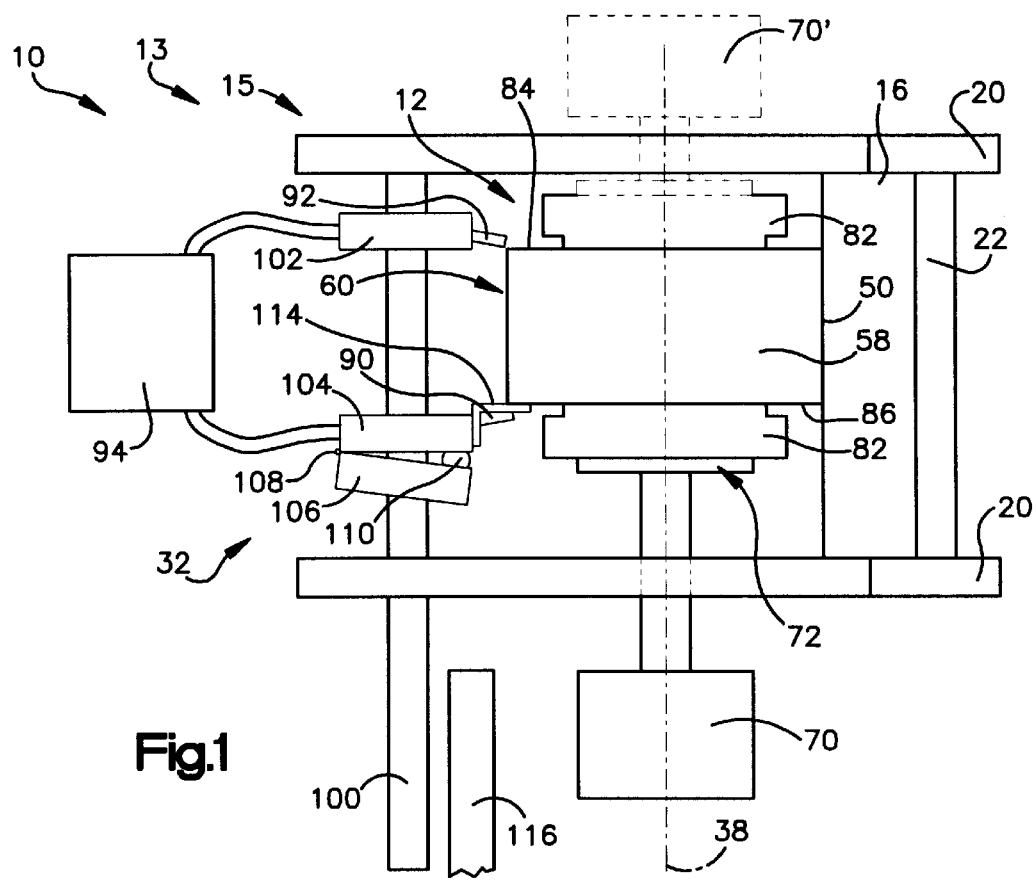
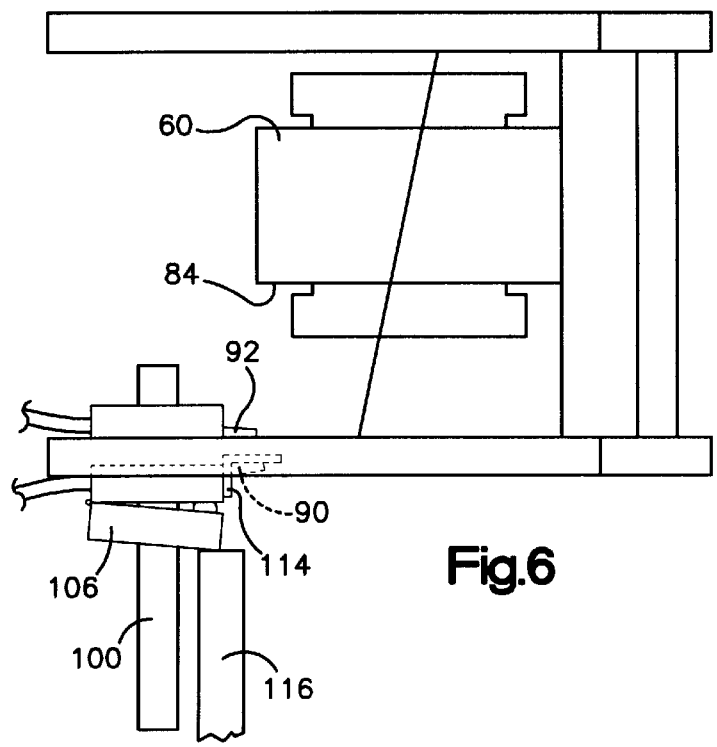

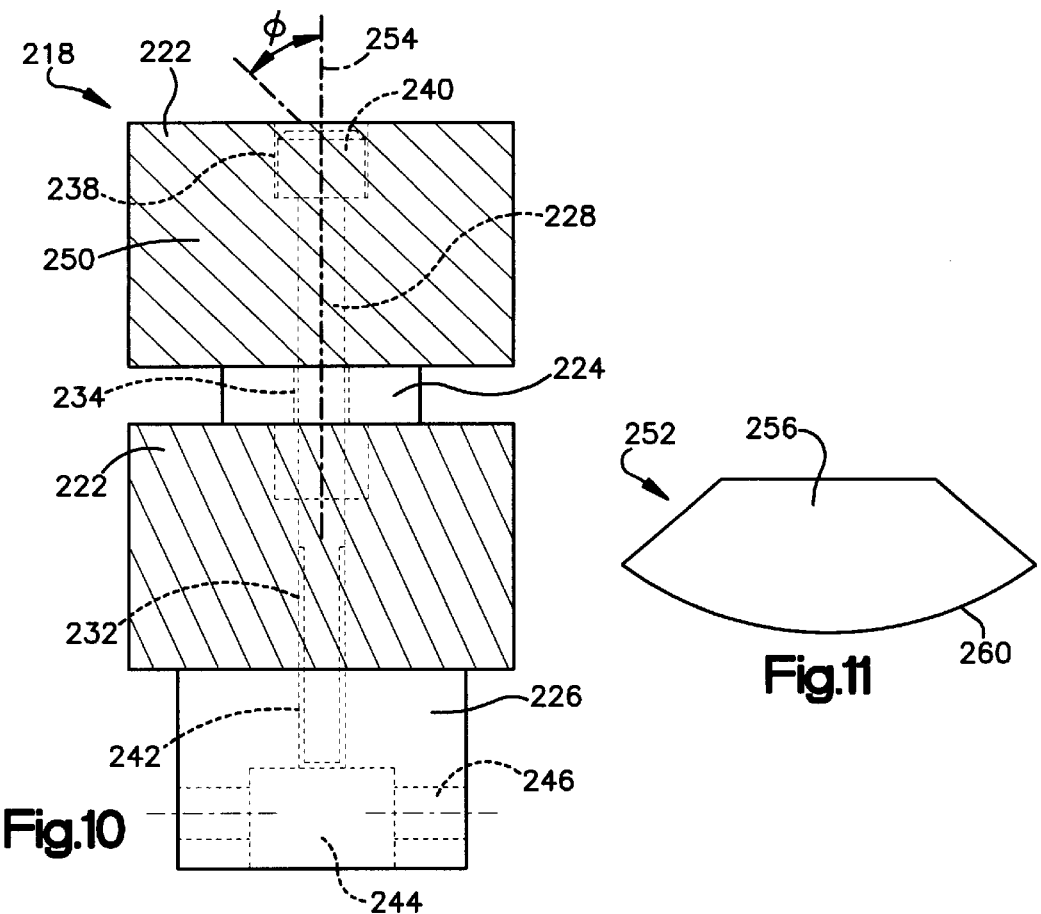
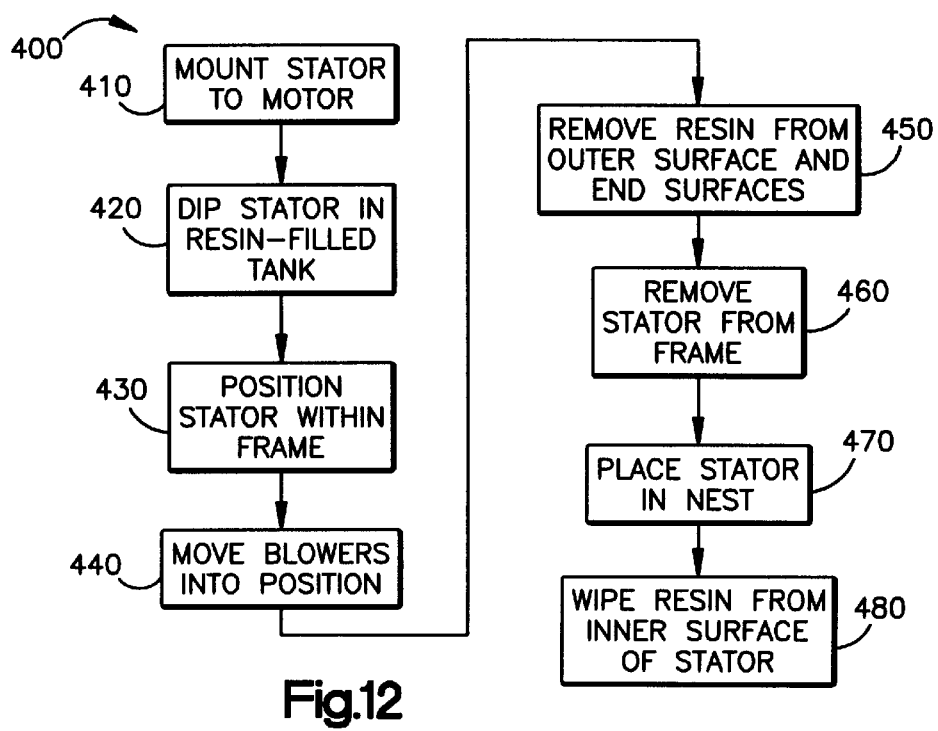

STATOR CORE RESIN REMOVER

FIELD OF THE INVENTION

The invention relates to apparatus and methods for removing resin from a stator core of a motor. Specifically, the invention relates to apparatus and methods for wiping resin from the inner and outer circumferential surfaces of the stator core, and blowing air to push resin off end surfaces of the core.

DESCRIPTION OF THE RELATED ART

A stator of a motor includes a stator core and windings partially located in slots in the core. In many stators resin is applied to the end portions of the windings (e.g., the portions of the winding protruding outside of the slots), in order to make the windings less prone to damage.

One method of applying the resin is to dip the entire stator in a tank of resin. However, after the stator is dipped in resin, the resin must be removed from the stator core. It is particularly desirable that resin be removed from the end surfaces and the inner circumferential surface of the core, in order to preserve the clearance between the inside of the stator and the outside of the motor's rotor. Similarly, it is desirable to remove resin from the stator exterior circumferential surface, especially if the rotor is external. The mentioned clearance may be as small as 0.010 inch to begin with, and thus resin protruding from the inner circumferential surface of the stator core may cause an "iron strike" between the rotor and stator, wherein the rotor and stator rub on one side or the other. In other words, an excess amount of resin on a portion of the stator may block the intended clearance between the rotor and stator being eliminated, leading to iron strike. This rubbing can damage either or both the rotor and stator, and can shift the rotor within the stator to an out-of-center position, adversely affecting motor performance.

Conventionally, resin has been removed from stator cores by manually wiping the cores with paper wipes. This process is slow and unreliable—an operator could easily miss wiping an area of the core, and the presence of resin on a portion of the core cannot always be detected by sight. It is particularly difficult to clean the resin from between the end winding portions, where the windings protrude from the slots. Resin tends to collect there, and if still remaining during a baking or other drying process, the resin tends to run down the circumferential surfaces of the core, and may result in stator/rotor clearance problems.

It can be seen from the foregoing that there is a need for a faster and more reliable method of removing resin from stator cores.

SUMMARY OF THE INVENTION

The present invention provides for removing excess resin, i.e., resin in excess of that needed to insulate the end windings and stator body, from a stator core of a motor. According to one aspect, the invention provides for removing resin from an inner circumferential surface surrounding a bore of the stator core. According to another aspect, the invention provides for removing resin from the outer circumferential surface of the stator core. The invention also relates to the removal of excess resin from end windings along end surfaces of the stator core.

Resin is removed from the circumferential surfaces by relative movement between the surfaces and one or more wipers. The wiper(s) push the resin off the surfaces as they sweep the surfaces.

According to an aspect of the invention, resin is removed from one or both circumferential surfaces by one or more wipers, the wiper(s) and stator being in position relative to each other so that when there is relative movement between the wiper(s) and the stator, excess resin is wiped from the stator.

According to another aspect, resin is removed from the end surfaces by blowing the resin radially inward, where it either drips off the core or is deposited on the inner circumferential surface, from which it is removed by wipers, for example, wipers which also wipe resin from the inner circumferential surface.

According to another aspect, a method for removing resin from a stator includes the steps of wiping resin from the outer circumferential surface or area of the stator, removing resin from the ends of the stator, and wiping resin from the inner circumferential surface or area of the stator.

According to one aspect of the invention, a system for removing resin from a core of a stator includes means for rotating the stator, and an outside diameter resin remover having a frame and wipers attached to the frame for removing the resin from an outer circumferential surface of the core as the stator rotates within the frame.

According to another aspect of the invention, a system for removing resin from a core of a stator includes a stand having a nest for mounting the stator, and an inside diameter resin remover having a holder and wipers attached to the holder for removing the resin from an inner circumferential surface of the core as the holder moves through a bore of the core.

According to yet another aspect of the invention, a method of removing resin from a stator includes the steps of rotating the stator, and wiping resin from an outer circumferential surface of the stator using outer wipers.

According to a further aspect of the invention, a resin remover for removing resin from a stator core includes wiper blades inclined to an axis of the bore of the stator, and a support for maintaining the blades in positional relationship to each other and the axis, wherein the blades remove the resin from a surface of the core when the blades sweep the surface.

According to a still further aspect of the invention, a device for removing resin from a stator core includes means for rotating a stator relative to an outside diameter resin remover, the outside diameter resin remover including means for removing resin from an outer circumferential surface of the stator core.

According to another aspect of the invention, a system of removing excess resin from a stator includes a blower for blowing excess resin off of an end surface of the stator, an outer wiper for wiping excess resin off an outer circumferential surface of the stator, and an inner wiper for wiping excess resin of an inner circumferential surface of the stator.

According to yet another aspect of the invention, a method for manufacturing a stator includes the steps of dipping the stator in resin, rotating the stator, and wiping resin from an outer circumferential surface of the stator using outer wipers.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is side view of a resin removal system of the present invention for removing resin from the outer circumferential surface and end surfaces of a stator core;

FIG. 6 is a side view of the system of FIG. 1 with the blower system retracted;

FIG. 10 is a side view of a wiper assembly of the system of FIG. 7;

FIG. 11 is a plan view of a wiper blade of the system of FIG. 7;

FIG. 12 is a flow chart of a method of removing resin from a stator core in accordance with the present invention.

DETAILED DESCRIPTION

Figure 2A:
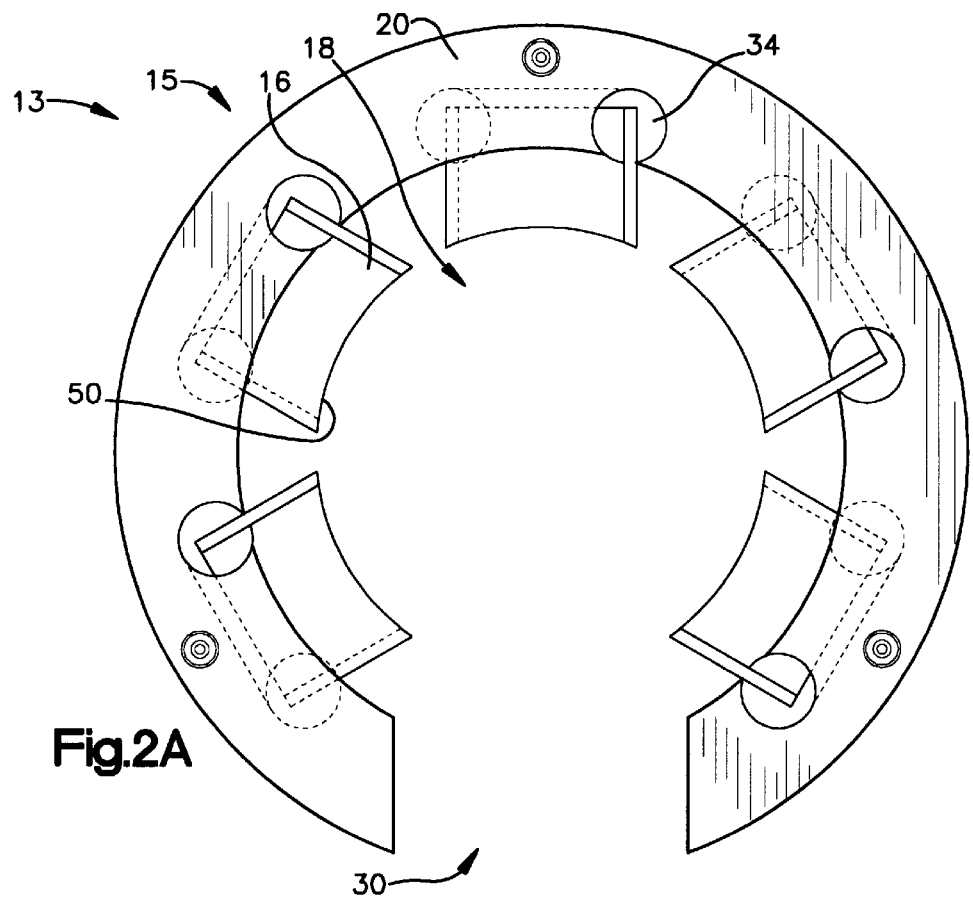
FIGS. 2A, 2B, and 2C are plan, side, and perspective views, respectively, of a frame of the system of FIG. 1.

Referring initially to FIG. 1, a resin removal system 10 to remove resin from a stator 12 includes an outside diameter resin remover system 13 and an inside diameter resin remove system 14. "Attached", as used herein, is to be understood as embracing connections that are not permanent and allow relative motion. An open area 18 in the frame 15 is intended to receive the stator 12 from which resin is to be wiped from the outside circumferential surface, as is described further below.

The resin remover 13 includes a frame 15 and one or more wipers such as wiper blades 16 attached to the frame 15.

In an exemplary embodiment of a method of the invention using systems 13 and 14, a stator is centrally positioned relative to the outer diameter resin remover. The stator is rotated while resin is wiped from the outer circumferential surface of the stator core and resin is blown from the end surfaces of the stator core either off of the core or to the inner circumferential surface of the core. The stator is placed in the inside diameter resin removal system and an inside diameter resin remover is passed first up and then down through the core of the stator, wiping resin from the inner circumferential surface of the stator.

Figure 2B:
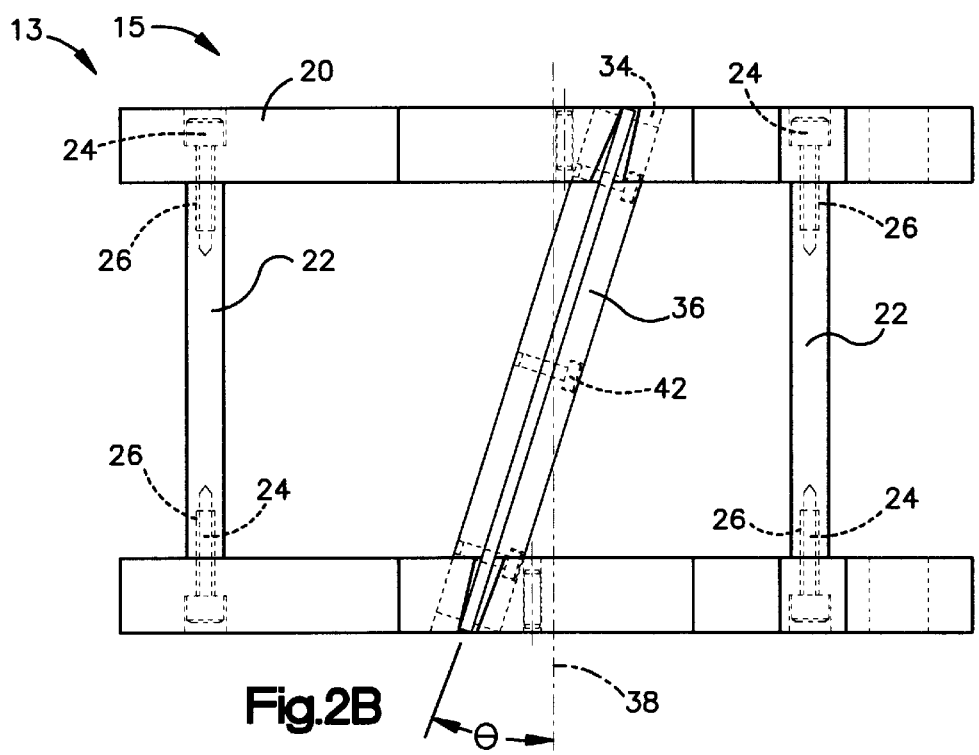
Figure 2C:
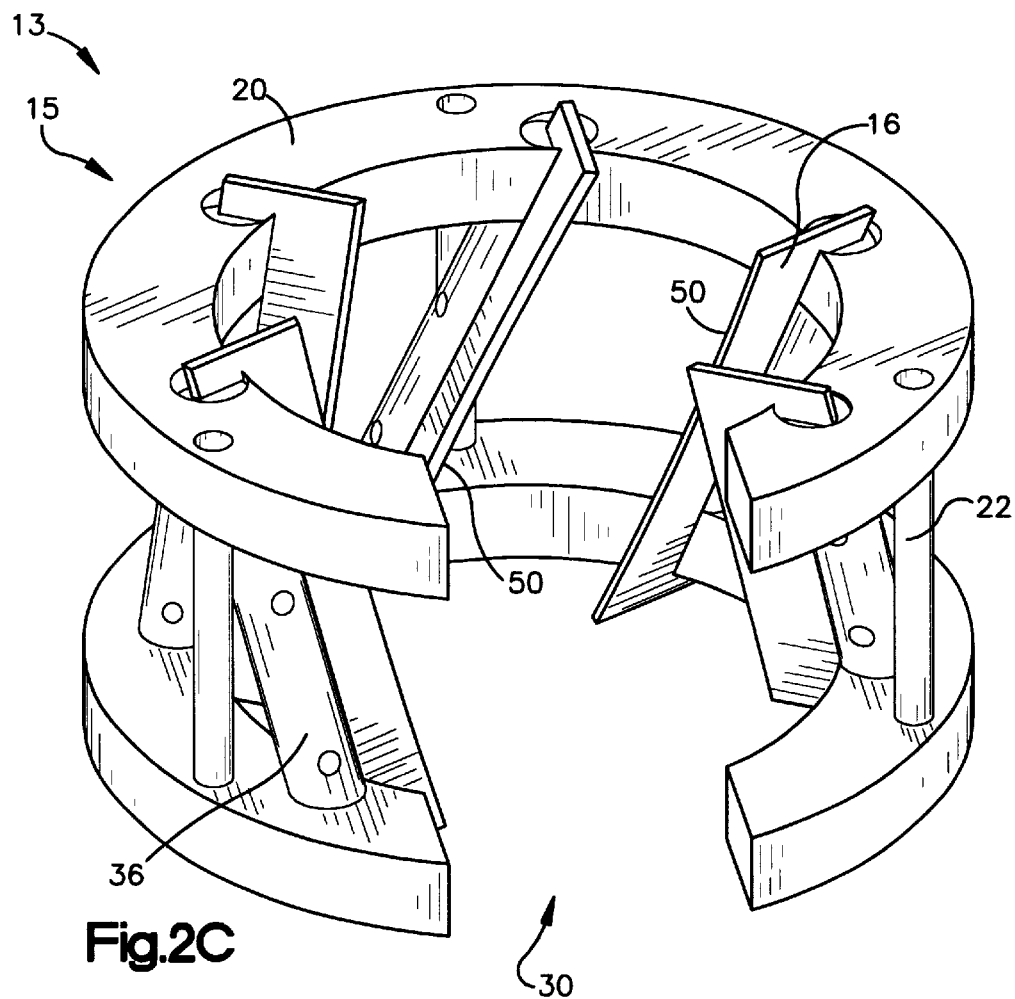

The frame 15 has a pair of circular members 20, separated by posts 22, best shown in FIGS. 2A–2C. The posts 22 may be secured to the frame 15 by screws 24 mating with threaded holes 26 in the posts 22. Thus, the posts 22 hold the circular members in spaced apart relation. The circular members 20 have open sections 30 to allow placement of a blower system 32 as described below.

The circular members 20 have holes 34 therein for receiving and supporting brackets 36, which in turn support the wiper blades 16. The holes 34 may be inclined relative to axis 38 (FIGS. 1 and 2B) of the frame 15 in order to hold the brackets 36 and the blades 16 inclined relative to the rest of the frame 15, as described in greater detail below. The brackets 36 are attached to each of the members 20 by passing the brackets 36 through an appropriate pair of the holes 34. The blades 16 are secured in the brackets 36 as described below.

Figures 3A, 3B:
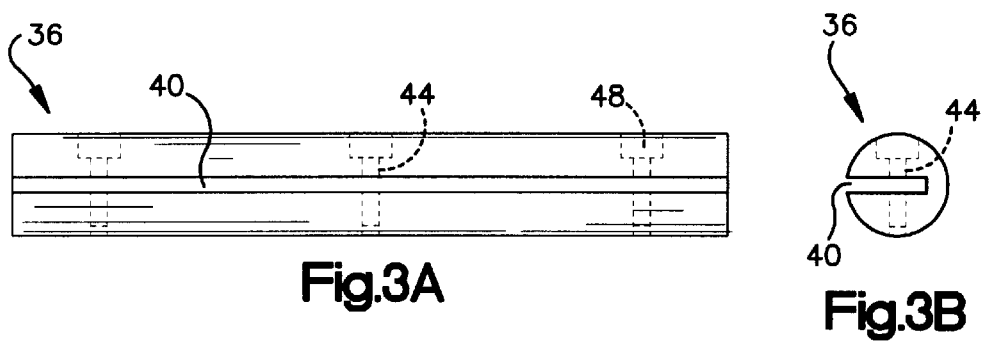
FIGS. 3A and 3B are side and end views, respectively, of a bracket of the system of FIG. 1.

Referring to FIGS. 3A and 3B, details of one of the brackets 36 are shown. The bracket 36 has a circular cross-section to conform to the holes 34 for relatively secure or close fit retention therein so there is no substantial movement or vibration of the bracket 36 during use, although it will be appreciated that other cross-sections may be used. The bracket 36 has a slot 40 in it to receive one of the blades 16. The blade 16 is secured in the bracket 36 by inserting screws 42 (FIG. 2B) in internally threaded holes 44 in the bracket 36 while the blade 16 is in the slot 40. The screws 42 pass through holes 46 in the blade 16 (FIG. 4) and hold the blade 16 in place. Recesses 48 at the screw holes 44 in the bracket 36 conceal (recess) the heads of the screws 42. A blade 16 may be replaced when worn by removing the screws 42 from the respective blade supporting bracket 36 and then removing the blade 16 from the slot 40. A new blade then may be secured in the slot 40.

Figure 4:
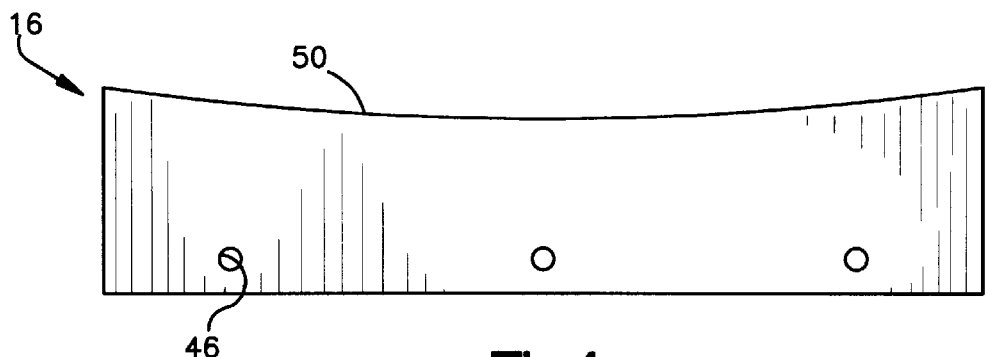
FIG. 4 is a plan view of a wiper blade of the system of FIG. 1.

Details of the blade 16 are shown in FIG. 4. As noted above, the blade 16 has holes 46 therein to allow it to be secured to the bracket 36. The blade 16 has a wiping surface 50. The wiping surface 50 is curved to conform to the outer circumferential surface 58 (shown in FIG. 1, for example) of the stator core 60 when the blade 16 is inclined as described below.

The blades 16 may be made of rubber, such as neoprene, or another compliant material suitable for achieving the objectives of the invention. The members 20, the posts 22, and the brackets 36 may be made of plastic, metal or other material suitable for achieving the objectives of the invention.

As shown schematically in FIG. 1, the stator 12 is positioned centrally in the space or area 18 within the frame 15 while connected to a motor 70 mounted below the stator 12. The stator 12 is rotatable about the axis 38, which coincides with the axis of the bore of the stator 12, by means of the motor 70. It will be appreciated that alternative means may be employed to position the stator 12 centrally within the frame 15 while allowing the stator 12 to rotate. For example, the stator 12 may be mounted to a turntable (not shown) which is turned by a motor. Alternatively, the stator 12 may be connected to a motor 70' above the stator 12, as shown by dashed lines in FIG. 1.

Figure 5:
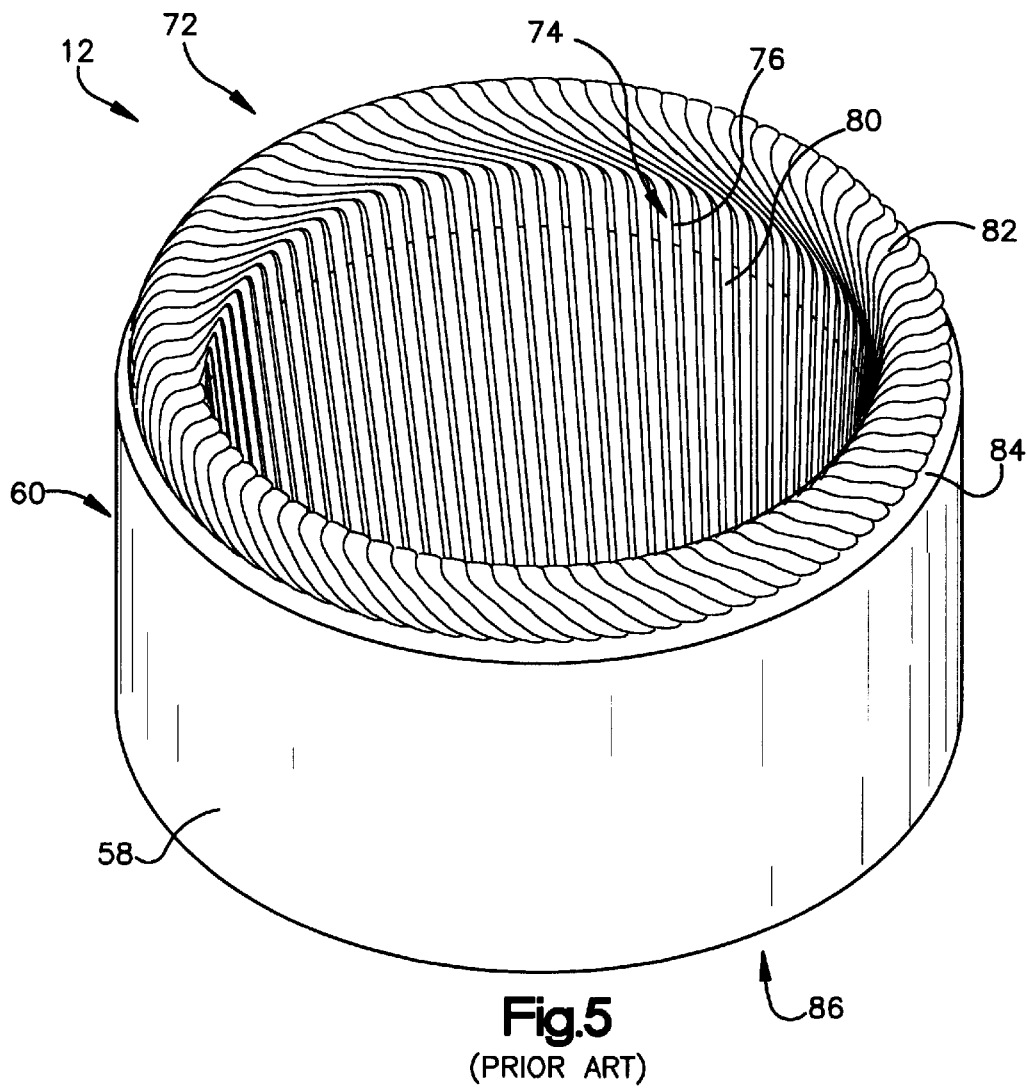
FIG. 5 is a perspective view of a prior art stator.

An exemplary stator 12 of typical design is shown in FIG. 5. The stator core 60 is made of a ferromagnetic material. The stator 12 also has windings 72 of wire partially situated in a plurality of longitudinal slots 74 along an inner circumferential surface 76 of the core 60. Each of the slots 74 is typically adapted to receive two embedded portions 80 of the windings 72. The windings 72 have end winding portions 82 electrically connecting together the embedded portions 80 of the windings 72 from different of the slots 74, in a suitable conventional manner.

As the stator 12 is rotated relative to the resin remover 13, the wiping surfaces 50 of the blades 16 sweep across the outer circumferential surface 58 of the stator 12, removing resin from the surface 58 by scraping, sweeping, brushing, or the like (hereinafter "scraping" or "sweeping").

The blades 16 may be located at an angle of inclination θ relative to the axis 38, as shown, for example, in FIGS. 1 and 2B. Inclining the blades 16 relative to the axis 38 increases the contact area between the blades 16 and the outer circumferential surface 58, thus improving performance of the blades 16. In addition, having the blades 16 inclined allows the resin to be directed downward as the outer circumferential surface 58 is wiped, when the stator 12 is rotated in an appropriate direction (e.g., clockwise when viewed from above for the stator 12 shown in FIG. 1).

An exemplary value of the angle of inclination θ is 18°, although it will be appreciated that the blades may be inclined at other angles.

While the outside diameter resin remover has been described and shown above as having five blades, in FIG. 2A, for example, it will be appreciated that a greater or lesser number of blades may be employed.

Returning to FIG. 1, the outside diameter resin removal system 13 also includes the blower system 32. The blower system 32 pushes resin from end surfaces 84 and 86 of the stator core 60 radially inwardly toward the inner circumferential surface 76 (FIG. 5) of the stator core 60. Resin has a tendency to accumulate along the end surfaces 84 and 86 between the end winding portions 82 where the portions 82 emerge from the slots 74. The blower system 32 includes a pair of blowers 90 and 92 connected to an air supply 94, which is shown schematically in FIG. 1. The blowers 90 and 92 may utilize copper tubing or other suitable tubing or nozzles. As the stator 12 rotates in the space 18, streams of air from the blowers 90 and 92 are directed radially inwardly at successive parts of the respective end surfaces 86 and 84. These streams of air push resin, particularly resin between the end winding portions 82, off of the end surfaces 84 and 86 and either onto the inner circumferential surface 76 of the stator core 60, or off of the stator 12 altogether.

The blowers 90 and 92 are connected to a pole 100 which can move up and down by means of a motor (not shown). The pole 100 may be independently mounted or supported and be positioned relative to the frame 15 to perform the functions described below in association with the blower 32, or the pole 100 may be connected for support from or relative to the frame 15 or some other part of the system 13. The upper blower 92 is connected to the pole 100 at a fixed location along the length of the pole 100 by a mounting block 102. The lower blower 90 is releasably clamped to the pole 100 by a clamping mechanism 103, which includes a pair of supports 104 and 106 which are connected by a hinge 108 with a spring 110 between them. For example, the pole 100 extends through openings (not shown) in the supports 104, 106. The spring 110 is biased to push the supports 104 and 106 apart, clamping them or frictionally engaging them to the pole 100 when no outside force is pressing against either of the supports 104 and/or 106. However, if either of the supports 104 and 106 contacts an object, thereby pushing the supports 104 and 106 together against the spring force, the supports 104 and 106 no longer clamp the pole 100 and the pole 100 slides freely therewithin relative to the blower 90.

Initially, when the stator 12 is placed within the frame 15, the pole 100 is in a recessed position, as shown in FIG. 6, with the blowers 90 and 92 in close proximity to one another. As the pole 100 is raised, the blowers 90 and 92 remain in close proximity until a tab 114 on the support 104 contacts the end surface 86 of the stator core 12 when the blower 90 is in position to blow resin from the end surface 86. The force produced by this contact unclamps the blower 90 from the pole 100. The support 104 may have sufficient frictional connection with the pole 100 even when unclamped so the support 104 and the blower 90 stay stationary as the pole 100 continues to rise, the support 104 maintaining sufficient frictional engagement with the pole 100 to keep the blower 90 stationary relative to the end surface 86. Thus the blower 90 is automatically, accurately positioned relative to the end surface 86 of the stator core 60 by use of the clamping mechanism 103.

When the pole 100 is retracted, the blower 90 again is clamped securely to the pole 100, as the tab 114 is released, and remains clamped to the pole 100 until the support 106 contacts the upper end of a stop 116, which contact is illustrated in FIG. 6. The force produced by this contact unclamps the blower 90 from the pole 100, and the blower 90 stays stationary as the pole 100 is further retracted. Retracting the pole 100 and the blowers 90 and 92 provides easier access to the stator 12 and/or for insertion, placement, and removal of the stator 12 relative to the frame 15.

It will be appreciated that the blower system 32 may be operated simultaneously with or separately from the outside diameter resin remover 13.

Figure 7:
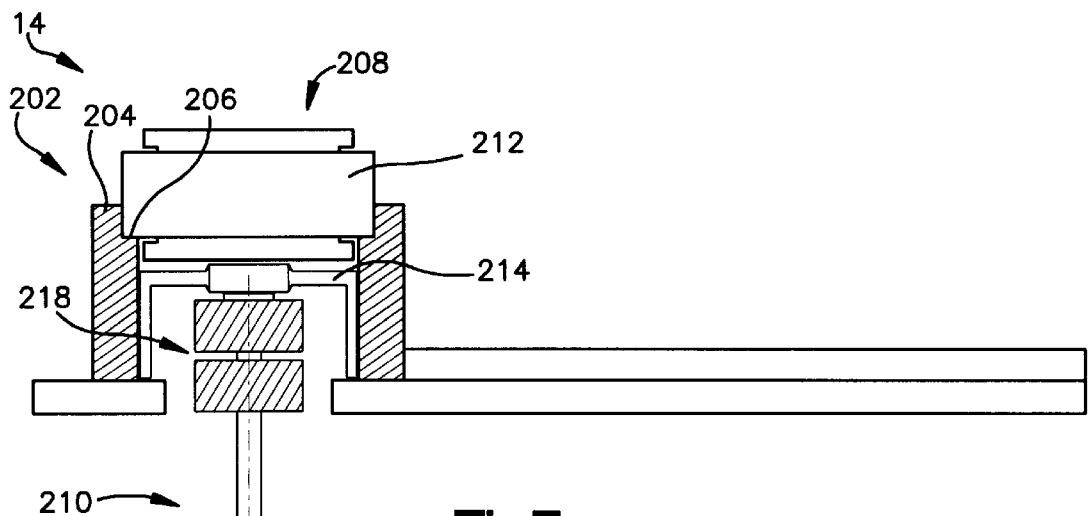
FIG. 7 is a side sectional view of a resin removal system of the present invention for removing resin from the inner circumferential surface of a stator core.
Figure 8:
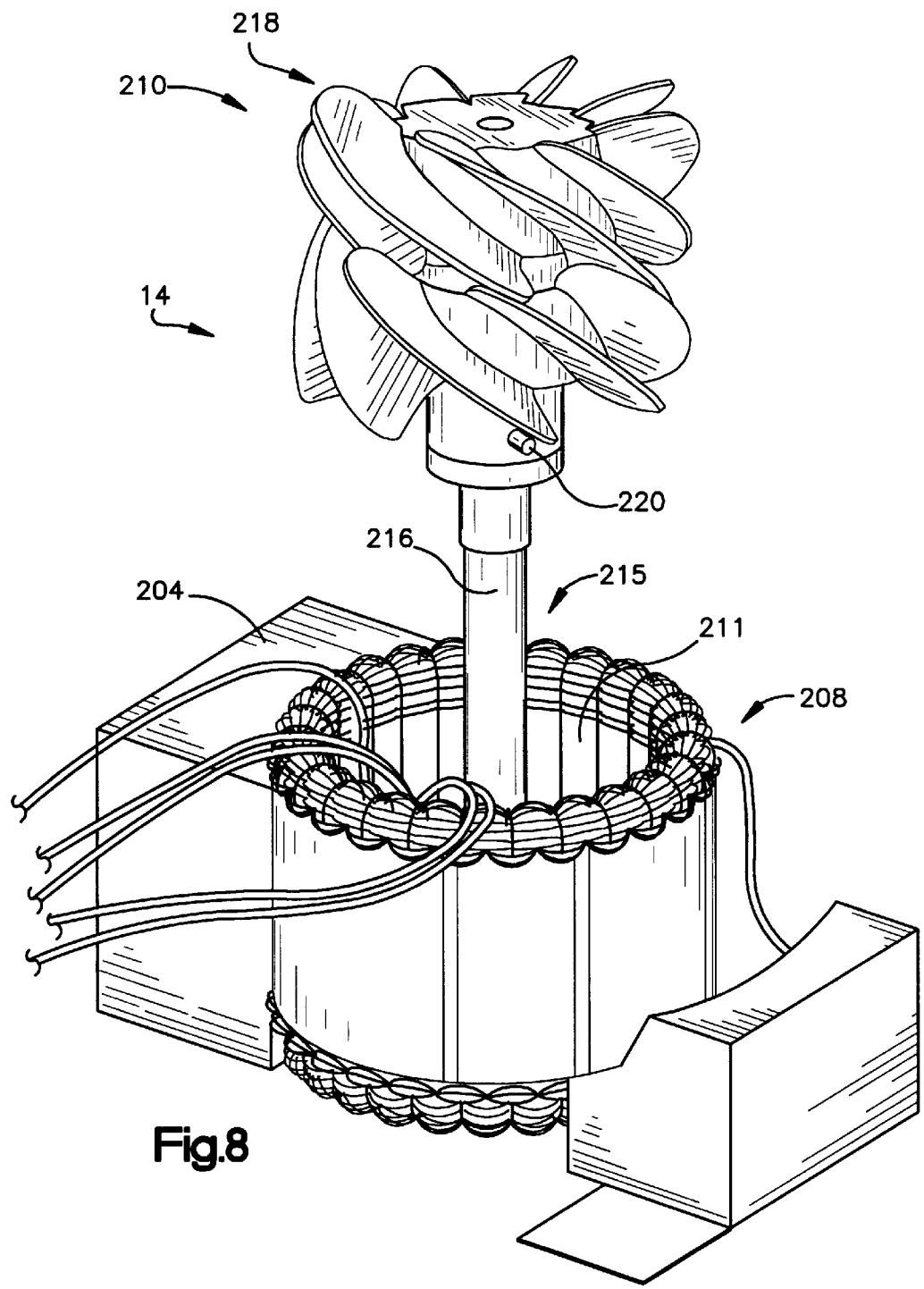
FIG. 8 is a perspective view of the resin removal system of FIG. 7, with the inside diameter resin remover protruding through the stator core.

Referring to FIGS. 7 and 8, an inside diameter resin removal system 14 is shown. The system 14 includes a stand 202 having a nest 204 with a stepped surface 206 for holding a stator 208. The stator 208 may be the same as the stator 12 described above. The system 14 uses a brush-like or scraper-like resin removing device 210 to remove resin from an inner circumferential surface 211 (FIG. 8) of a core 212 of the stator 208.

The stand 202 includes an attached cleaner 214 for scraping resin from the remover device 210 as the remover device 210 passes up into and back down out of a bore 215 of the stator 208, as best shown in FIG. 8. The cleaner 214, for example, may be a plastic piece with a circular opening, the opening being narrow enough that the parts of the cleaner 214 adjacent the opening contacting wipers and removing resin from them by scraping and/or squeezing as wiper assembly 218 is moved through the opening. Besides scraping resin from the resin remover 210, the cleaner 214 facilitates centering the resin remover device 210 as it is inserted in the bore 215 of the stator 208.

Figure 9:
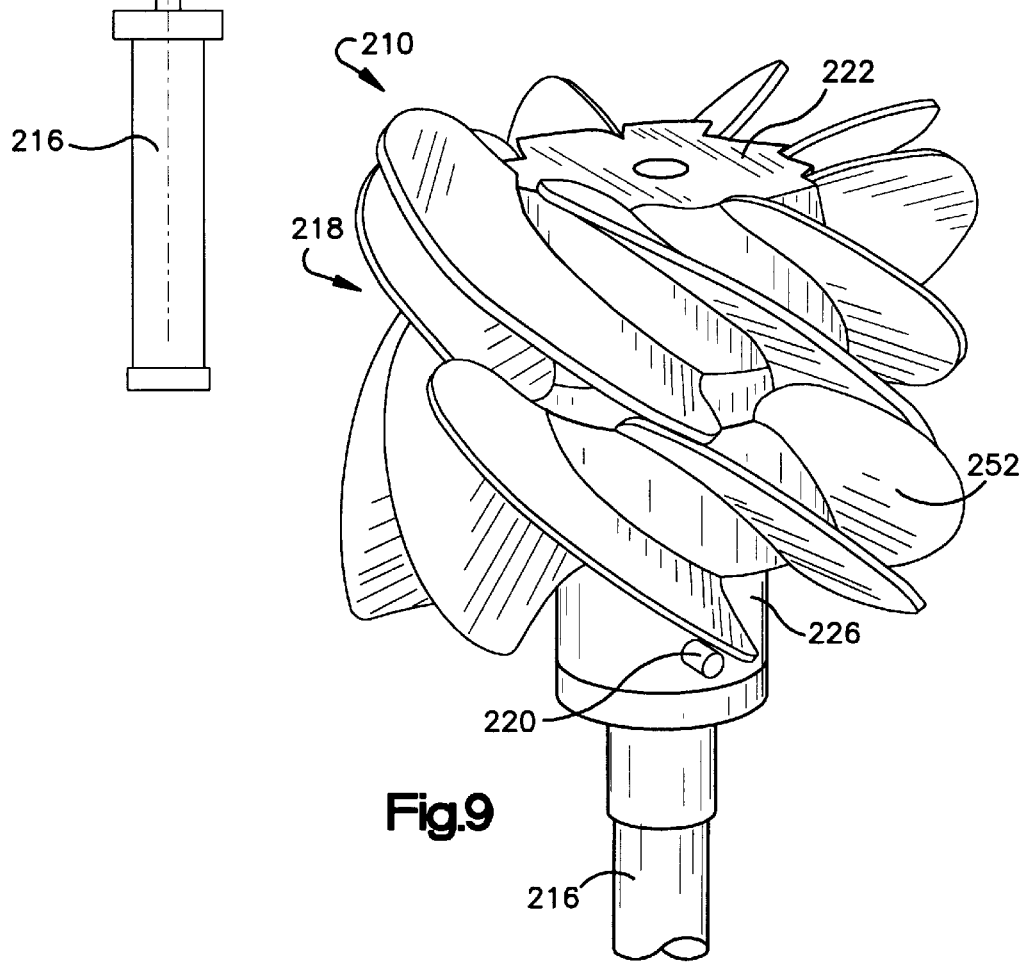
FIG. 9 is a perspective view of the inside diameter resin remover of the resin removal system of FIG. 7.

Referring to FIG. 9, the resin remover device 210 has a handle or shaft 216 and the wiper assembly 218. The handle 216 is connected to the wiper assembly 218 by a pin 220.

FIG. 10 shows the details of some parts of the wiper assembly 218. The assembly 218 includes cylindrical holders 222, a disk-shaped spacer 224 between the holders 222, a fitting 226, and an assembly bolt or screw 228. The holders 222 and the spacer 224 have central holes 232 and 234, respectively, to allow passage of the body of the bolt or screw 228 therethrough; the holders 222 have recesses 238 in one end to contain a head 240 of the bolt or screw 228. The fitting 226 includes a threaded hole 242 at one end, a recess 244 in the opposite end for receiving the handle or shaft 216, and a hole 246 passing through the recess 244 for receiving the pin 220. The assembly 218 is put together by stacking the fitting 226 and the holders 222 with the spacer 224 between them, and then inserting the screw 228 through the central holes 232 and 234 and screwing it into the threaded hole 242 in the fitting 226.

The fitting 226, the holders 222, and the spacer 224 may be made of plastic or another suitable material. While the inside diameter resin remover has been described and shown above as using two identical holders, it will be appreciated that a greater or lesser number of holders may be used, and that the holders need not be identical. The holders 232 may be identical, which facilitates using only one or more than one; the only change would be the length of the bolt or screw 228.

The holders 222 also include slots 250 for containing wipers such as wiper blade 252 shown in FIG. 11. The blades 252 are held in the slots 250 by use of set screws (not shown).

The slots 250 are inclined at an angle φ relative to axis 254 of the wiper assembly 218. It will be appreciated that the axis 254 of the assembly 218 coincides with the axis of the bore 215 of the stator 208 when the wiper assembly 218 is passed through the bore 215. Wiping is improved by inclining the blades 252 to the axis 254, since inclining increases the wiping area of each of the blades 252, and inclined blades urge the resin downward as they wipe.

The blades 252 have a straight and narrow edge or end 256 designed to fit into one of the slots 250 of the holder 222, and a wider curved wiping surface 260 at the opposite edge or end. The wiping surface 260 is curved to conform to the inner circumferential surface 211 of the stator core 212.

The blades 252 may be made of rubber or another compliant material suitable for achieving the objectives of the invention.

Excess resin is removed using the resin removal system 200 by placing the stator 208 in the nest 206, and then passing the wiper assembly 218 first up through the stator bore 215 (as shown in FIG. 8) and then back down through the bore 215. The wiper assembly 218 is moved along the axis 254 by moving the resin remover device 210. This is accomplished by moving the handle 216, either manually or automatically, such as by a motor (not shown). The blades 252 connected to the holders 222 of the wiper assembly 218 thereby scrape resin from the inner circumferential surface 211 of the stator 208.

The wiper assembly 218 need not be rotated relative to the inner circumferential surface 211, since the inclination of the blades 252 allows all of the inner circumferential surface 211 to be wiped without rotation. Alternatively, however, the wiper assembly and/or the stator may be rotated.

Figure 13A:
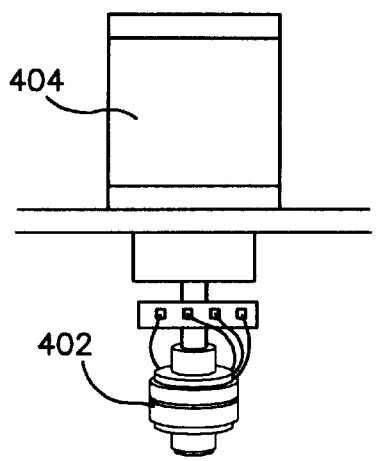
FIGS. 13A–13D are illustrations of various steps of the method shown in FIG. 12.
Figure 13B:
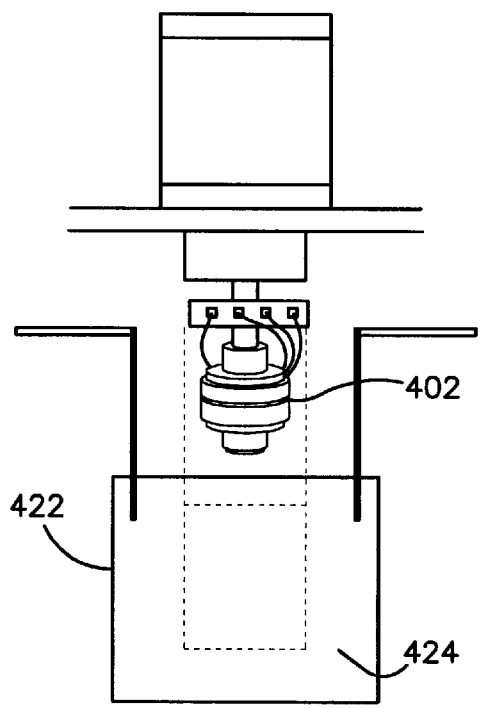
Figure 13C:
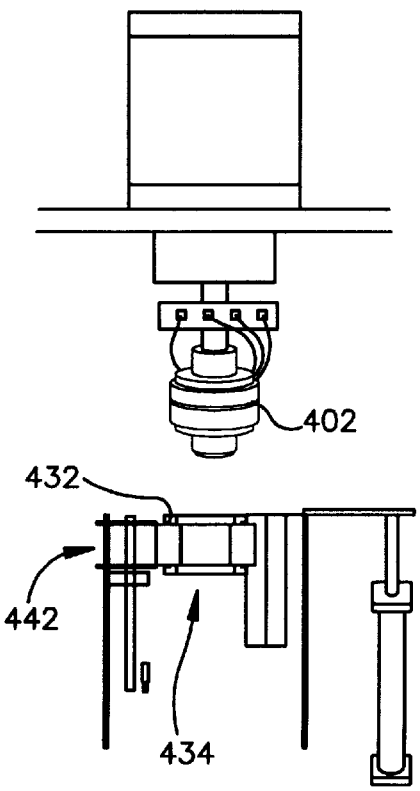

FIGS. 12 and 13A–13D show a flow chart of a method 400 for applying resin to stator 402, and removing resin from a core of the stator 402, and illustrations of the steps thereof. In the method 400, the stator 402 is initially mounted to a motor 404 in step 410 (FIG. 13A). Next, in step 420, the stator 402 is dipped in a tank 422 filled with resin 424 (FIG. 13B). In step 430, the stator 402 is centrally positioned within a frame 432 of an outer diameter resin remover 434 such as the system 13 described above (FIG. 13C). Then in step 440, blowers 442 are moved into place adjacent the top and bottom surfaces of the core of the stator 402. Air flow to the blowers 442 is actuated and the stator 402 is rotated in step 450, thereby wiping resin from the outer circumferential surface of the stator core while simultaneously blowing resin from the end surfaces of the stator core either off of the core or to the inner circumferential surface of the core. It will be appreciated that the operations of wiping resin from the outer circumferential surface and blowing resin from the end surfaces need not be performed simultaneously.

Figure 13D:
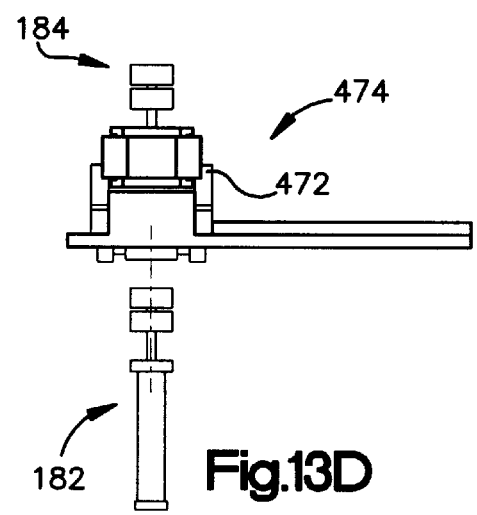

In step 460, the blowers 442 are moved downward and the stator 402 is removed from the frame 432. Next, in step 470, the stator 402 is placed in a nest 472 of an inside diameter resin removal system 474, such as the system 14 described above. Finally, in step 480, an inside diameter resin remover 482 is passed first up to position 484 and then down through the core of the stator 402, wiping resin from the inner circumferential surface of the stator 402 (FIG. 13D). Thus resin is removed from the surfaces of the stator core, and the core can proceed to a baking or other drying process.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such equivalents, alterations, modifications and variations that fall within the spirit and scope of the appended claims.

What is claimed is:

1. A system for removing resin from a core of a stator, comprising:
   a system for rotating the stator; and
   an outside diameter resin remover which includes:
      a frame which includes at least two circular members held in a spaced-apart relationship by posts; and
      wipers attached to the frame for removing the resin from an outer circumferential surface of the core as the stator rotates within the frame.

2. The system of claim 1 wherein the wipers are blades.

3. The system of claim 2 wherein the blades are made of rubber.

4. The system of claim 1 wherein the frame also includes brackets attached to the circular members, the blades each being attached to respective of the brackets.

5. The system of claim 2 wherein the blades are inclined relative to an axis of the stator.

6. The system of claim 5 wherein the blades have an arcuate wiping surface conforming to the outer circumferential surface of the stator.

7. The system of claim 2 wherein the inclination of the blades pushes the resin downward as the stator rotates.

8. The system of claim 1, further comprising a first blower for blowing air across a first end surface of the core, thereby removing resin from the first end surface.

9. The system of claim 8, further comprising a second blower for blowing air across a second end surface of the stator, thereby removing resin from the second end surface.

10. A system for removing resin from a stator core, comprising:
    a system for rotating the stator; and
    an outside diameter resin remover which includes:
       a frame;
       wipers attached to the frame for removing the resin from an outer circumferential surface of the core as the stator rotates within the frame; and
       a first blower for blowing air across a first end surface of the core, thereby removing resin from the first end surface; and
       a tab connected to the first blower which contacts the first end surface to aid in positioning the first blower relative to the first end surface.

11. The system of claim 8 wherein the frame also includes brackets attached to the circular members, the blades each being attached to respective of the brackets, the members each having an open section to allow placement of the first blower.

12. The system of claim 11 wherein the means for rotating is a motor connected to the stator.

13. A system for removing resin from a core of a stator, comprising:
   a stand having a nest for mounting the stator; and
   an inside diameter resin remover which includes:
      a holder; and
      wipers attached to the holder for removing the resin from an inner circumferential surface of the core as the holder moves through a bore of the core.

14. The system of claim 13 wherein the wipers are blades.

15. The system of claim 14 wherein the blades are made of rubber.

16. The system of claim 14 wherein the blades are inclined relative to an axis of the stator.

17. The system of claim 16 wherein the blades have an arcuate wiping surface conforming to the inner circumferential surface of the stator.

18. The system of claim 17 further comprising a cleaner connected to the stand for removing resin from the blades and the holder.

19. The system of claim 18 wherein the resin remover also includes a shaft attached to the holder and means for moving the shaft along the axis.

20. A resin remover for removing resin from a stator core, comprising:
   wiper blades inclined to an axis of the bore of the stator,
   a support for maintaining the blades in positional relationship to each other and the axis, the blades removing the resin from a circumferential surface of the core when the blades sweep the circumferential surface, the blades having arcuate wiping surfaces conforming to the circumferential surface; and
   a blower for blowing air across an end surface of the stator.

21. A device for removing resin from a stator core, comprising:
   means for blowing excess resin off of an end surface of the stator;
   means for wiping excess resin off an outer circumferential surface of the stator; and
   means for wiping excess resin of an inner circumferential surface of the stator.

22. The device of claim 21, further comprising means for removing resin from the end surfaces of the core.

23. A system for removing excess resin from a stator, comprising:
   a blower for blowing excess resin off of an end surface of the stator;
   an outer wiper for wiping excess resin off an outer circumferential surface of the stator; and
   an inner wiper for wiping excess resin of an inner circumferential surface of the stator.

* * * * *